US011431638B2

(12) United States Patent
May et al.

(10) Patent No.: US 11,431,638 B2
(45) Date of Patent: Aug. 30, 2022

(54) SYSTEM AND METHOD FOR MONITORING AND MANAGING VIDEO STREAM CONTENT

(71) Applicant: Sandvine Corporation, Waterloo (CA)

(72) Inventors: Darrell Reginald May, Waterloo (CA); Bojja Krishna Chaitanya, Andhra Pradesh (IN); Srinivas Chintamaneni, Karnataka (IN)

(*) Notice: Subject to any disclaimer, the term of this patent is extended or adjusted under 35 U.S.C. 154(b) by 0 days.

(21) Appl. No.: 17/070,089

(22) Filed: Oct. 14, 2020

(65) Prior Publication Data

US 2021/0112010 A1 Apr. 15, 2021

(30) Foreign Application Priority Data

Oct. 14, 2019 (IN) .............................. 201911041534

(51) Int. Cl.
*H04L 12/851* (2013.01)
*H04L 12/841* (2013.01)
(Continued)

(52) U.S. Cl.
CPC .............. *H04L 47/24* (2013.01); *H04L 47/28* (2013.01); *H04L 65/60* (2013.01)

(58) Field of Classification Search
CPC ....... H04L 47/24; H04L 47/28; H04L 65/608; H04L 65/60
(Continued)

(56) References Cited

U.S. PATENT DOCUMENTS 9,098,699 B1 * 8/2015 Zaslavsky .......... H04N 21/2585
9,716,791 B1 * 7/2017 Moran ................ H04L 65/1076
(Continued)

FOREIGN PATENT DOCUMENTS

CN 109218721 A * 1/2019
CN 109561322 A 4/2019
(Continued)

OTHER PUBLICATIONS

Rentian Huang et al, Electronic Fraud Detection for Video-on-Demand System Using Hybrid Immunology-Inspired Algorithms, Lecture Notes in Computer Science; [Lecture Notes in Computer Science; Lect.Notes Computer], Springer Berlin Heidelberg, Berlin Germany, pp. 290-303, (Jul. 26, 2010), ISSN 0302-9743, ISBN 978-3-030-67069-6, XP019147359.
(Continued)

*Primary Examiner* — Ruolei Zong
(74) *Attorney, Agent, or Firm* — Amarok IP Inc.; Neil W. Henderson

(57) ABSTRACT

A system and method for managing and monitoring video stream content. The method including: receiving a traffic flow; determining if the traffic flow is a video streaming traffic flow; if the traffic flow is a video streaming traffic flow; determine at least one attribute associated with the video streaming traffic flow; determine a probability that the traffic flow is fraudulent based on a heuristic analysis of the at least one associated attribute; if the probability is above a predetermined threshold, flag the traffic flow as a fraudulent video streaming traffic flow, otherwise allow the traffic flow to proceed to its destination without being flagged; if the traffic flow is not a video streaming traffic flow, allow the traffic flow to proceed to its destination.

20 Claims, 6 Drawing Sheets

(51) Int. Cl.
*H04L 29/06* (2006.01)
*H04L 47/24* (2022.01)
*H04L 47/28* (2022.01)
*H04L 65/60* (2022.01)

(58) Field of Classification Search
USPC .......................................................... 709/219
See application file for complete search history.

(56) References Cited

U.S. PATENT DOCUMENTS

| | | | |
|---|---|---|---|
| 2008/0040224 A1* | 2/2008 | Roker | H04L 63/14 |
| | | | 705/14.66 |
| 2013/0259228 A1* | 10/2013 | Ren | H04L 63/123 |
| | | | 380/200 |
| 2014/0233385 A1* | 8/2014 | Beliveau | H04L 47/122 |
| | | | 370/235 |
| 2019/0132282 A1* | 5/2019 | Lei | H04L 63/0245 |
| 2020/0221073 A1* | 7/2020 | Kim | H04N 7/007 |
| 2021/0067563 A1* | 3/2021 | Rogers | G06N 3/0454 |

FOREIGN PATENT DOCUMENTS

| | | | | |
|---|---|---|---|---|
| CN | 109889543 A | * | 6/2019 | ............ H04L 29/08 |
| JP | 2008172767 A | * | 7/2008 | |
| WO | 2016207899 A1 | | 12/2016 | |

OTHER PUBLICATIONS

European Patent Office, European Search Report for corresponding EP Patent Application No. 20201707.5, dated Mar. 1, 2021.

* cited by examiner

SYSTEM AND METHOD FOR MONITORING AND MANAGING VIDEO STREAM CONTENT

RELATED APPLICATIONS

The present disclosure claims priority to the Indian Patent Application No. 201911041534 filed on Oct. 15, 2019, which is hereby incorporated herein in its entirety.

FIELD

The present disclosure relates generally to computer network traffic. More particularly, the present disclosure relates to a system and method for monitoring and managing video stream content and legitimacy.

BACKGROUND

Use of online video continues to become more and more popular on computer networks. Streaming Video is a dominant traffic type in consumer data networks. There are many legitimate sources of video and many subscribers or customers subscribe to legitimate video sources. Unfortunately, there are subscribers who attempt to stream video content from illegitimate sources. Video providers in conjunction with Internet Service Providers (ISPs) are keenly interested in reducing and eliminating the illegal sources for streaming video.

Internet Service Providers or Operators are constantly striving to maximize the Quality of Experience (QoE) for legitimate video streaming users while optimizing the network and amending the policies associated with the network traffic. Understanding which streaming video traffic is legitimate is important to an operator, as streaming video makes up a large portion of the traffic traversing the networks.

The above information is presented as background information only to assist with an understanding of the present disclosure. No determination has been made, and no assertion is made, as to whether any of the above might be applicable as prior art with regard to the present disclosure.

SUMMARY

In a first aspect, there is provided a method for managing and monitoring video stream content the method including: receiving a traffic flow; determining if the traffic flow is a video streaming traffic flow; if the traffic flow is a video streaming traffic flow; determine at least one attribute associated with the video streaming traffic flow; determine a probability that the traffic flow is fraudulent based on a heuristic analysis of the at least one associated attribute; if the probability is above a predetermined threshold, flag the traffic flow as a fraudulent video streaming traffic flow, otherwise allow the traffic flow to proceed to its destination without being flagged; if the traffic flow is not a video streaming traffic flow, allow the traffic flow to proceed to its destination.

In some cases, determining the at least one attribute associated with the traffic flow may include: retrieving at least one packet from the traffic flow; determining at least one header of the at least one packet; and determining at least one attribute by determining at least one field from within the at least one header.

In some cases, the at least one header may be selected from the group of Internet Protocol Header; Transmission Control Protocol Header; HyperText Transfer Protocol; Transport Layer Security/Secure Sockets Layer Header; and Domain Name Server Header.

In some cases, determining at least one attribute associated with the traffic flow may include: determining a video frame of the video streaming traffic flow; performing a hash of the video frame of the video streaming traffic flow; retrieving a second hash of a video frame of a legitimate video stream; and comparing the hash to the second hash to determine whether the hashes match.

In some cases, determining a probability of that the traffic flow is fraudulent may include: retrieving at least one legitimate video stream attribute from a memory component; performing a comparison between the at least one legitimate video stream attributes and the at least one traffic flow attribute; and determining a match probability of the legitimated video stream and the traffic flow based on the comparison.

In some cases, the at least one attributes may be considered matched if the match probability is above 80%.

In some cases, determining a probability of that the traffic flow is fraudulent may include retrieving legitimate video stream attributes from a memory component; and performing a probabilistic matching algorithm with respect to the associated attributes of the video stream traffic flow with the retrieved legitimate video stream attributes.

In some cases, the method may include performing traffic actions on the video stream traffic flow if the probability that the traffic flow is fraudulent is above a second predetermined threshold.

In some cases, determining the at least one attribute associated with the traffic flow may include: determining a packet timestamp associated with the video streaming traffic flow.

In some cases, determining the at least one attribute associated with the traffic flow may include: retrieving at least one packet from the traffic flow; determining a packet payload from the at least one packet; and determining a channel name from the payload of the at least one packet.

In another aspect there is provided a system for managing and monitoring video stream content wherein the system includes: an analysis module configured to: receive a traffic flow; determine if the traffic flow is a video streaming traffic flow; if the traffic flow is a video streaming traffic flow; determine at least one attribute associated with the video streaming traffic flow; a video module configured to determine a probability that the traffic flow is fraudulent based on a heuristic analysis of the at least one associated attribute; and a reporting module configured to flag the traffic flow as a fraudulent video streaming traffic flow if the if the probability is above a predetermined threshold.

In some cases, the analysis module may be configured to: retrieve at least one packet from the traffic flow; determine at least one header of the at least one packet; and determine at least one attribute by determining at least one field from within the at least one header.

In some cases, the at least one header is selected from the group of Internet Protocol Header; Transmission Control Protocol Header; HyperText Transfer Protocol; Transport Layer Security/Secure Sockets Layer Header; and Domain Name Server Header.

In some cases, the analysis module may be further configured to: determine a video frame of the video streaming traffic flow; perform a hash of the video frame of the video streaming traffic flow; retrieve a second hash of a video frame of a legitimate video stream; and compare the hash to the second hash to determine whether the hashes match.

In some cases, the analysis module may be further configured to: retrieve at least one legitimate video stream attribute from a memory component; perform a comparison between the at least one legitimate video stream attributes and the at least one traffic flow attribute; and the video module is configured to determine a match probability of the legitimated video stream and the traffic flow based on the comparison.

In some cases, the at least one attributes may be considered matched if the match probability is above 80%.

In some cases, the analysis module may be further configured to: retrieve legitimate video stream attributes from a memory component; and perform a probabilistic matching algorithm with respect to the associated attributes of the video stream traffic flow with the retrieved legitimate video stream attributes.

In some cases, the reporting module may be further configured to perform traffic actions on the video stream traffic flow if the probability that the traffic flow is fraudulent is above a second predetermined threshold.

In some cases, the analysis module may be further configured to retrieve at least one packet from the video streaming traffic flow and determine a packet timestamp associated with the at least one packet.

In some cases, the analysis module may be further configured to: retrieve at least one packet from the traffic flow; determine a packet payload from the at least one packet; and determine a channel name from the payload of the at least one packet.

Other aspects and features of the present disclosure will become apparent to those ordinarily skilled in the art upon review of the following description of specific embodiments in conjunction with the accompanying figures.

BRIEF DESCRIPTION OF FIGURES

Embodiments of the present disclosure will now be described, by way of example only, with reference to the attached Figures.

DETAILED DESCRIPTION

In the following, various example systems and methods will be described herein to provide example embodiment(s). It will be understood that no embodiment described below is intended to limit any claimed invention. The claims are not limited to systems, apparatuses or methods having all of the features of any one embodiment or to features common to multiple or all of the embodiments described herein. A claim may include features taken from any embodiment as would be understood by one of skill in the art. The applicants, inventors or owners reserve all rights that they may have in any invention disclosed herein, for example the right to claim such an invention in a continuing or divisional application and do not intend to abandon, disclaim or dedicate to the public any such invention by its disclosure in this document.

Generally, the present disclosure provides a method and system for automatic managing and monitoring video stream content. The system and method are configured to determine whether a traffic flow is a video stream. Once a video stream has been detected, the system and method may determine various attributes or parameters associated with the stream. The system may then determine, for example, bitrate, channel data, frames and/or images, and other attributes associated with the video stream. From these attributes or parameters, the system may determine a probability of the video being an illegitimate stream of a video of another channel, or an unrelated legitimate video stream. If the probability the video stream is above a predetermined threshold, the system may flag the video stream or perform or have other network equipment perform traffic actions on the video stream traffic flow.

Figure 1:
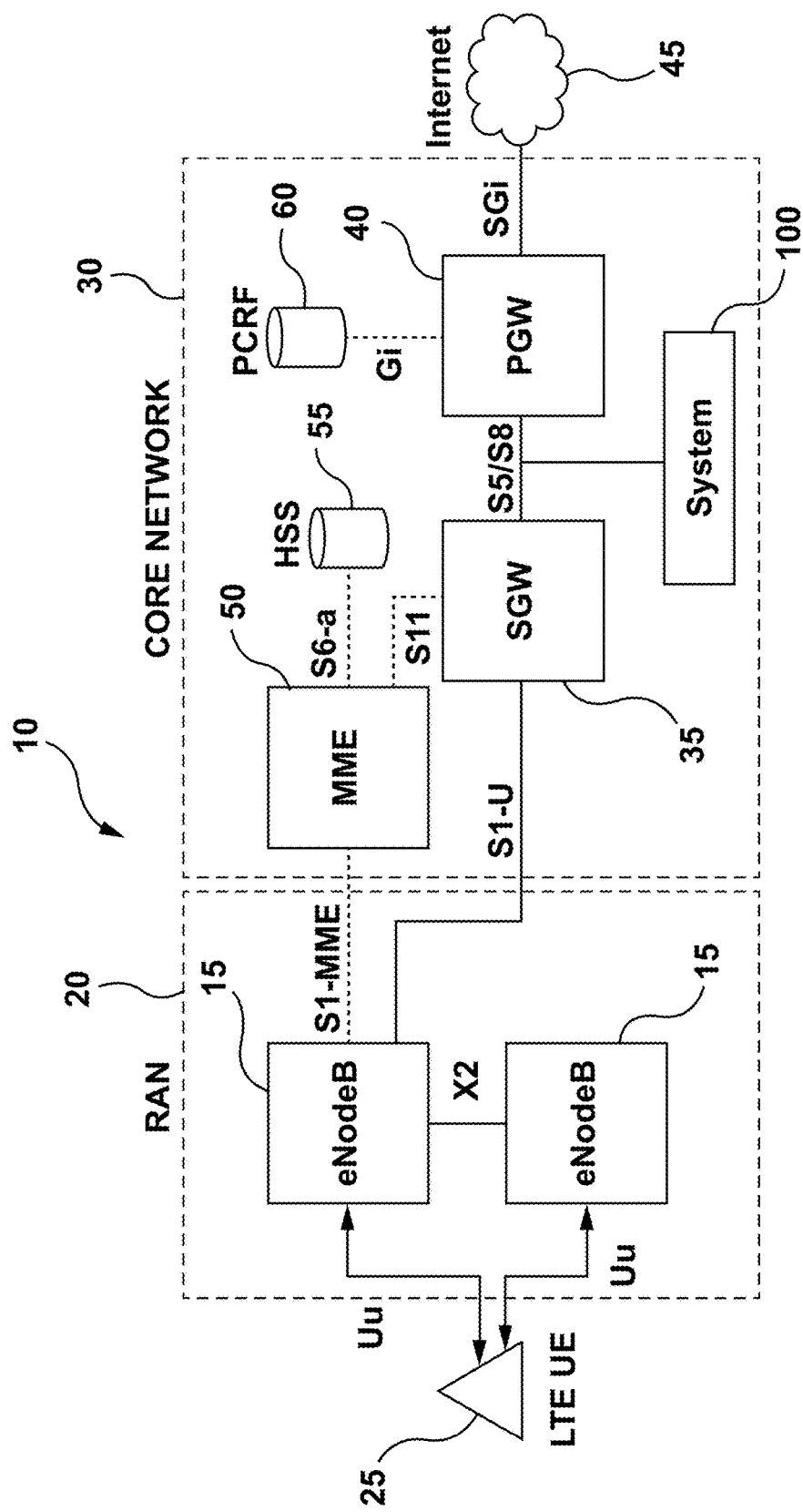
FIG. 1 illustrates a system for monitoring video stream content according to an embodiment in a network environment.

FIG. 1 shows a diagram of a Long Term Evolution (LTE) network 10 architecture. It will be understood that at least one Evolved Node Base station (eNodeB) resides within the LTE Radio Access Network (RAN) 20. The eNodeB is designed to allocate the network resources among the various LTE users 25. The RAN 20 is in communication with the core network 30. The eNodeB 15 connects to the core network 30 via a serving gateway (SGW) 35, which is further in communication with a packet data network gateway (PGW) 40 which is in communication with the Internet 45. The LTE network 10 further includes a Mobility Management entity (MME) 50, which is configured to track the LTE users 25. The MME 50 interacts with a Home Subscriber Server (HSS) database 55 to provide information with respect to the various users or subscribers 25 of the LTE 10. The LTE 10 includes a Policy and Charging Rules Function (PCRF) 60, which is intended to provide policy control and flow based charging decisions. It will be understood that FIG. 1 illustrates a high level network architecture and that an LTE network may include further aspects not illustrated. In some cases, the system may be located on the Internet side of the PGW.

A system 100 for monitoring video stream content is intended to reside in the core network 30. In particular, the system 100 may be an inline probe north of the PGW 40, between the SGW 35 and PGW 40, or in another location where the system is able to access the data noted herein. It will be understood that in some cases the system may be a physical network device, or may be a virtual networking device. In some cases, the system 100 may send data to the cloud to be processed or the system may process the data internally. One of skill in the art will understand that cloud processing includes processing by a remote processor and use of remote memory to store data during processing. Although FIG. 1 illustrates an LTE network, it will be understood that the system may be used on any Internet Protocol (IP) based networking system, for example, WiFi based, mobile data networks like GPRS, CDMA, 4G, 5G, satellite based, WLAN based networks, fixed line broadband fiber optic networks as well as on virtual private networks.

Figure 2:
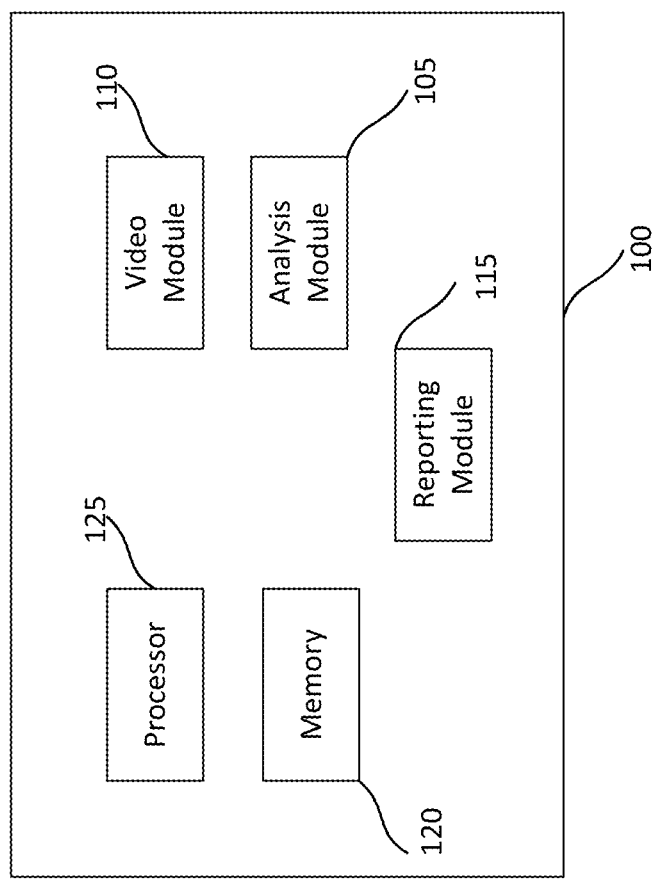
FIG. 2 is a illustrating an embodiment of a system for monitoring video stream content.

FIG. 2 illustrates an embodiment of a system 100 for automatic management or detection of video stream content. The system include an analysis module 105, a video module 110, a reporting module 115, at least one processor 120 and at least one memory component 125. The system 100 is intended to reside on the core network. The modules, including the processor 120 and memory 125, are in communication with each other but may be distributed over various network devices or may be housed within a single network device. The system 100 is intended to receive information from the network equipment, for example the LTE network equipment detailed herein, that allows the system 100 to determine traffic flow parameters.

The analysis module 105 is configured to determine various traffic flow attributes or parameters associated with the traffic flow. The analysis module 105 may determine whether the flow is a video streaming flow, via for example, deep packet inspection (DPI) or other similar method. If the traffic flow is not a video streaming traffic flow, the system may not further investigate the traffic flow. If the traffic flow is a video streaming traffic flow, the analysis module 105 may determine further attributes and parameters related to the traffic flow that may be used to determine whether the video streaming is from a legitimate video stream source. In particular, the analysis module 105 may determine attributes related to the traffic flow, such as, fields from within the headers associated with the traffic flow, the bitrate, the source, the destination, the video resolution, the video buffer health, the content delivery network (CDN), the latency, the QoE score, the video duration, the video frames, jitter, connections, session information, device data, and the like.

The video module 110 is configured to determine whether a video streaming traffic flow is a legitimate traffic flow. Based on the traffic flow attributes received the video module 110 is configured to analyze the video stream and determine a probability of whether the video stream is a legitimate or illegitimate stream as detailed herein.

The video module 110 is further configured to provide the reporting module 115 with the probability that the video stream is legitimate or illegitimate. In some cases, the reporting module 110 may provide a service provider with a flag or notice of a subscriber or source if the probability that the video is illegitimate is above a first predetermined threshold, for example 80%. In other cases, the reporting module may be further configured to issue a traffic action in relation to the video stream, for example, shaping or otherwise disrupting or terminating the video stream, if the probability that the video stream is an illegitimate stream is above a second predetermined threshold, for example 97%. In some cases, the first and second predetermined thresholds may be configured by the service provider. In some cases, the first and second predetermined thresholds may initialized on deployment of the system and may be configured from time to time based on the results obtained by the system.

Many service providers are concerned about video fraud detection and determining whether videos being streamed on the service provider's networks are legitimate. Traditionally, there has been significant manual effort in researching and identifying fraudulent video streams. Devices used to watch fraudulent video streams often may have signatures that may be easy to detect through manual review although the signatures may be selected in order to attempt to confuse traditional automated systems. Parameter review may include determining traffic flow attributes like Hostnames, IP Addresses and ports, and flow meta-data like HTTP Headers, and other flow parameters.

Fraudulent video streams are generally served in the same manner as legitimated video stream sources. This manner often includes server software used to stream to clients, hosting providers that provide hosting and compute resources used to build the streaming service.

Distinguishing between a legitimate and fraudulent video streaming service has conventionally required manual research. In particular, manual intervention was needed to determine how to access the video streams and provide payment for the service if the fraudulent video streaming service was a paid service. Once access was granted, an employee of an operator or other person was easily able to identify the video streams, how the video streams were being delivered and the "brand" name or legitimate source or original provider of the video stream.

In a specific example, a hypothetical fraudulent video source called "Super Fast Live Streams" could be hosted at www.superfasttv.tv. On that site users could sign up, pay a monthly free and obtain instructions on how to access various video streams. Access instruction could include various options such as web sites, Android or other operating system programs to access the content, or instructions on how to access with existing TV set top type hardware, like Android media centers, Kodi, or Infomir MAG boxes or the like. Frequently, the instructions include a different sites or IP addresses than the one used to purchase the service. For example, an HTTP Live Streaming (HLS) m3u8 file could contain all the channels the service provides and each has a host name, IP address and optionally port, a URL for each channel, and optionally further meta data about the channel, for example, the quality of the video channel (HD or SD).

In some cases, files such as m3u8 files may have optional meta data, for example, channel icons, episode guide information, and the like. In a particular example, the system may be able to retrieve meta data from the file as the file may include data such as:

EXTINF:0 tvg-logo="https://upload.wikimedia.org/wikipedia/commons/thumb/4/48/Logo_TVR_HD.svg/2000 px-Logo_TVR_HD.svg.png",TVR HD http://www.superfasttv.tv:1935/liveedge/TVRHD.stream/playlist.m3u8

EPG info: #EXTM3U url-tvg=http://www.superfasttv.tv/epg.xml.gz

In another specific example, a video stream imitating an HBO channel could be described as follows:

EXTINF:-1,-HBO_1_US
http://my.superstreamz.xyz/live/HBO_A1/live.m3u8?user=XXX&pass=YYYY From this data, it may become possible to associate my.superstreamz.xyz with the "Super Fast Live Streams" provider. Furthermore, the metadata label HBO_1_US would imply that the stream is HBO from the US. Therefore, it is possible to map the URL path component HBO_A1 to "HBO US"

In addition, as each entry in an m3u8 file can point directly to a video stream, or to another m3u8 file, eventually the actual video network flow can come from even more hosts, IP addresses and ports. Once there is access to this type of file, or if the network service provider or other operator accesses the video stream provider, it is possible to categorize these flows and determine which flows may not be legitimate.

Typically, service providers and operators were required to manually join these video streaming providers in order to classify the video streams. With embodiments of the system and method detailed herein, fraudulent video streaming detection is intended to be automated. By automating this process, operators are intended to save not only cost as there would not be a need to join the video provider services, but also time as reduced or no manual interference may be necessary.

Embodiments of the system are intended to have access to the legitimate video streams in some cases. In other cases, the system may have information or meta data about the legitimate video stream instead of or in addition to access to the legitimate video stream. The system may also have information or meta data related to previous research regarding fraudulent streams. In some cases, the memory component of the system may be initialized with decision matrices based on network flow attributes. The decision matrices may be used by the analysis module to determine if a video stream is likely to be fraudulent. The system is intended to maintain information or metadata related to be legitimate and illegitimate video services based on the previous results. The analysis module 105 is intended to recognize the name of a video services within the video flow and the video module 110 may determine if the video has previously distributed either legitimate or illegitimate video flow.

Figure 3:
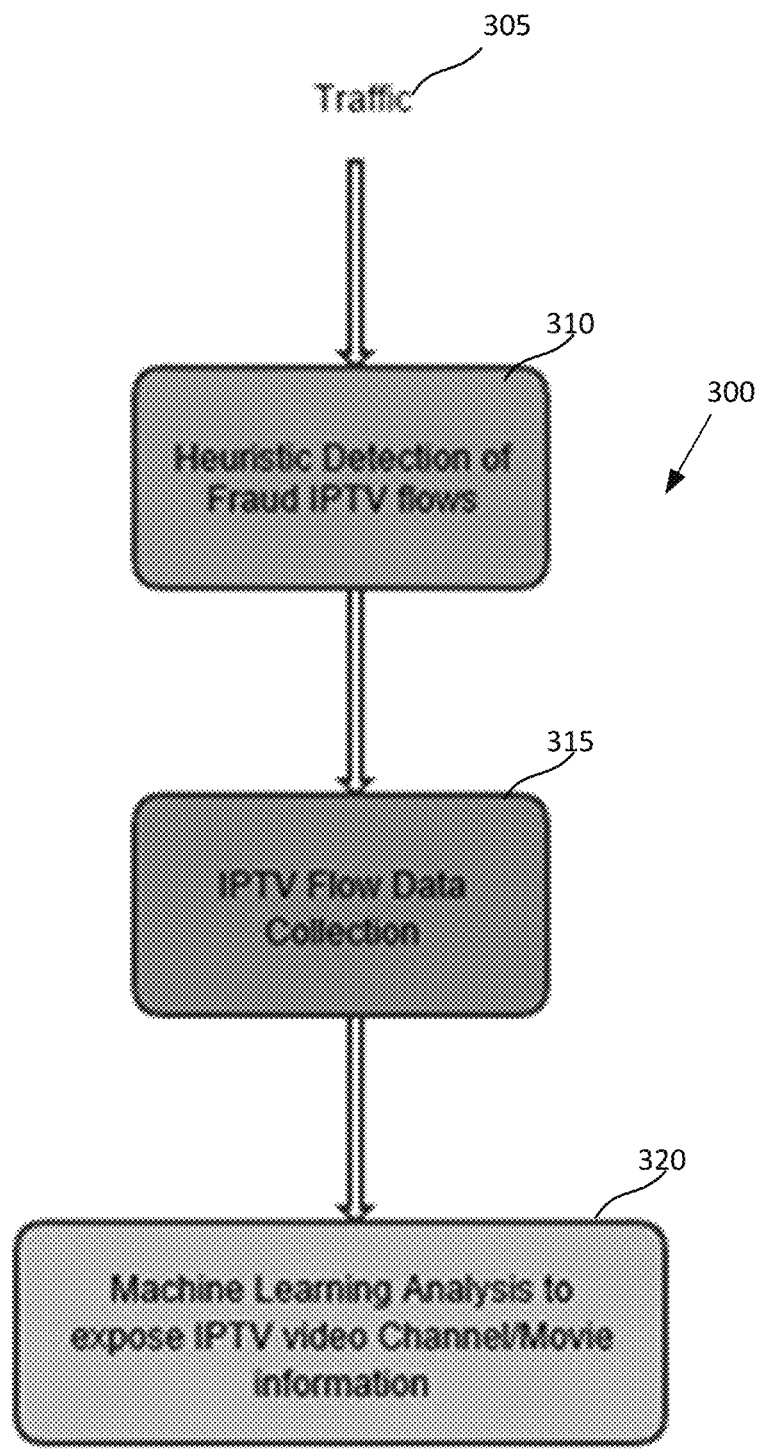
FIG. 3 illustrates a high level flow chart of a method for monitoring video stream content.

FIG. 3 illustrates a method 300 for initializing the system 100 for monitoring video streams according to an embodiment. The system 100 receives and reviews traffic flows. The system 100 determines whether the traffic flow is a video stream traffic flow. The system may then use heuristic detection of fraudulent video streams (sometimes referred to as IPTV flows). Heuristic detection may be based on the behavior analysis of the video flows and the streaming platform used by the video streaming service. This detection may use traffic flow level information, such as, IP header, TCP header, Application layer information (HTTP header) or the like. In some cases, machine learning may also be employed to generate or enhance the heuristic detection. Further, the system may also receive legitimate IPTV flow data or may otherwise collect legitimate IPTV flow data. The system may then employ a machine learning technique, for example, regression methods, classification methods, unsupervised machine learning methods, data mining, Natural language processing (NLP) based models or the like to detect the content of the video stream.

In the example noted above, a new provider may have appeared, for example, "Lighting Streamz" hosted at lightning-streamz.tv that hosts video sources, which may be the same as Super Fast Live Streams. Conventionally, a new provider, for example "Lighting Streamz" might not be detected until the decision matrices are updated manually.

In the embodiments of the system and method, the video content may be analyzed automatically, for example, attributes of the video stream traffic flow may include video frame data and other video content attributes. In some cases, the system may analyze (both online and offline) attributes such as the exposed meta data by the video stream or its characteristics to provide identification. In some cases, the meta data attributes may include, for example, channel names, video titles, and the like which may be present in the URL.

In other cases, this meta data may not be available and embodiments of the system and method are configured to extract attributes for example other characteristics and correlate across many stream sources to deduce the video stream content. The attributes that may be extracted may refer to the signatures or other details that determine if the flow is coming from a MAG box or using any streaming framework that may typically be used for fraudulent video stream. Attributes such as meta data may refer to the application data information for the video streaming flow, for example, the HTTP headers containing video provider name and the like. The traffic flow attributes or parameters describe the various details of the flow, and may include the meta data and characteristics, and may further include information, for example, server IP, port, HTTP header data and the like.

Once a fraudulent video provider has been identified the system is intended to categorize the attributes, for example: IP's, hosts, channel names, movie titles and the like. The system may use the attribute information to detect uncategorized traffic that matches the attributes and determine a probability of whether the traffic is fraudulent or illegitimate given the attribute matches.

The system will export flow attributes for traffic that is not categorized as fraudulent video, for example, the system may amend the format or otherwise process the flow attributes to be in an acceptable format to be reviewed and correlated with the video information by, for example, the analysis module 105.

This flow attributes may include data points such as, Packet Timestamp, CDN, Device used, as well as information that may be present in the fields of the Internet Protocol (IP) Header; Transmission Control Protocol (TCP) Header; HyperText Transfer Protocol (HTTP) Header; Transport Layer Security/Secure Sockets Layer (TLS/SSL) Header; and Domain Name Server (DNS) Header and the like. In some cases, the flow attributes may also include IP, ports, host names, URL's, TLS SNI, flow bitrates, DNS requests, selected payload packets, URI, User-Agent, Cookie, and the like.

When the system determines these flow attributes from an uncategorized traffic flow, the analysis module 105 is configured to correlate the uncategorized flow attributes with known attributes from known fraudulent video providers, via the decision matrix.

In an example, the trigger may be to identify a fraudulent video stream through a match in a host name that is associated with the video streams. From this detection, further flows may be either inspected or inferred based on behavior, for example the flow attributes, or time. In some cases, the time gap may be determined as a time gap between the categorized and uncategorized video flow. After analysis of the behavior, the video may be classified as belonging to a specific provider.

In a case where the host is not previously known, the system may look for device signatures present in traffic attributes like HTTP Headers, DNS requests, IP Packet fields. The system is intended to also look at traffic flow attributes like URLS, to match known patterns from fraudulent video providers. In some cases, fraudulent video providers attempt to add further text to the URLS or other attributes in order to confuse exact match results. The system is intended to use fuzzy logic, other probabilistic matching models, or other advance data science or statistical model to determine whether the uncategorized video stream may be categorized as fraudulent. In some cases, the matching may determine provide for a probability that the match is fraudulent. If the probability is above a predetermined threshold, for example 80%, the video stream may be marked as fraudulent. If the probability is below a predetermined threshold, the system may review further attributes of the video stream to provide further input as to whether the video may be fraudulent. The predetermined threshold may be configurable and may be amended from time to time based on the accuracy of the results received by the system.

Figure 4:
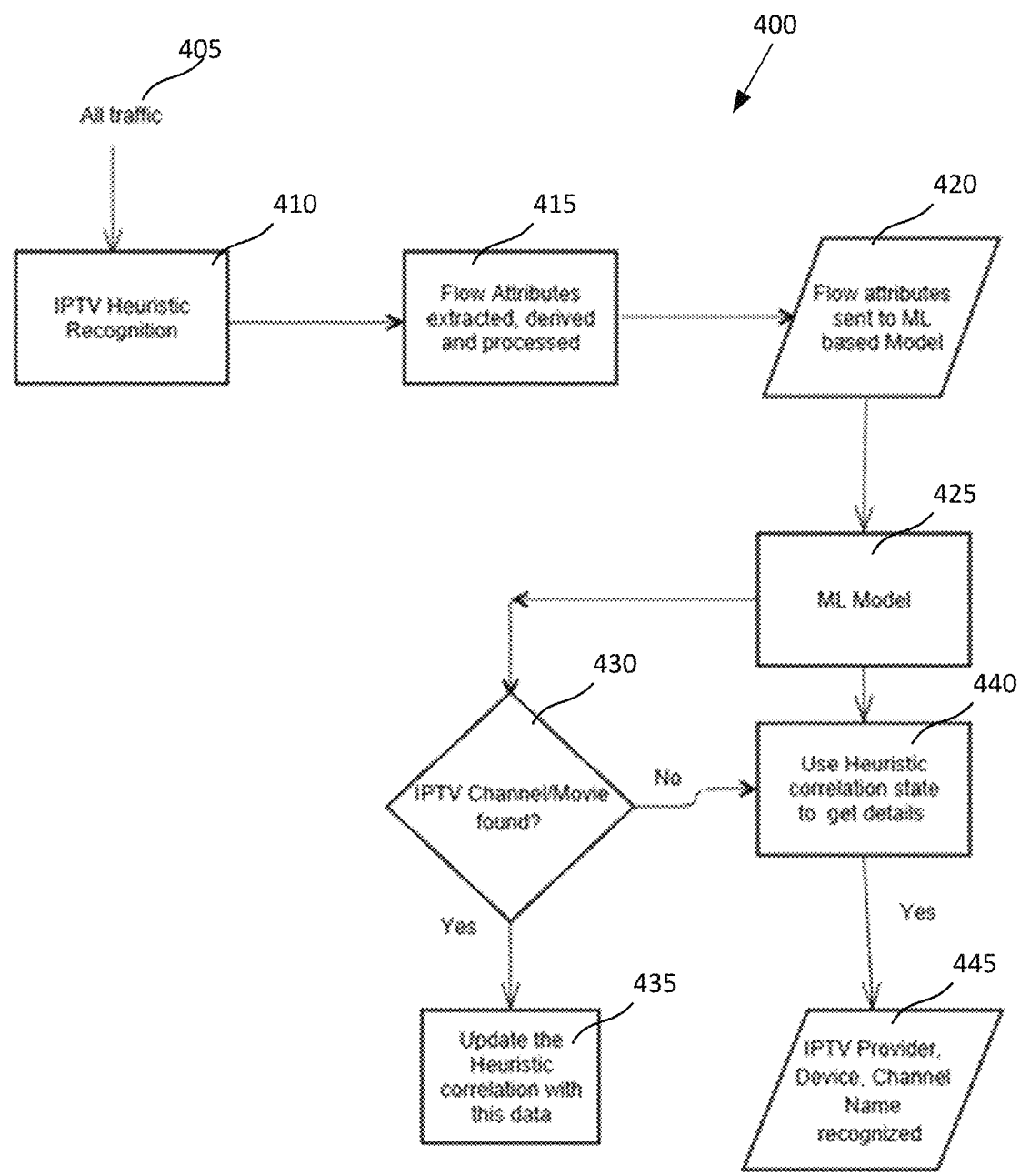
FIG. 4 illustrates an embodiment of a method for monitoring video stream content.

FIG. 4 illustrates a method 400 for monitoring and managing video streaming according to an embodiment. The system 100 is configured to receive and review all traffic flows, at 405. The analysis module 105 determines which flows are likely to be video streaming flows, at 410. In some cases, the system may use heuristic techniques to recognize video streaming flows (sometimes referred to as IPTV flows), at 415. Once a video streaming flow is recognized the flow attributes may be extracted or derived and may then be processed by the analysis module 105. Extracted attributes may be extracted from, for example the HTTP header fields, the IPs, and the like. Derived attributes may be derived from various methods and may be inferred or obtained from deriving the attribute from the flow attributes.

At 420, the flow attributes may then be reviewed and analyzed based on machine learning and the decision matrices associated with the analysis module 110. The machine learning associated with the analysis module 105 may determine whether a video streaming channel or movie has been found, at 425. If the video module 110 determines that the probability is above a predetermined threshold, at 430, for example the predetermined first threshold of 80% or other configurable threshold, the video stream may be classified as fraudulent and any further data or attributes associated with the video stream may be include in future analyses, at 435.

The analysis may use various correlations to determine whether the video stream may be considered fraudulent, at 440, and the stored attributes may be continuously added to or updated in order to provide up to date correlation with respect to video streams. If the video stream provider, device, and/or channel name of the video stream flow is recognized by the system as likely to be fraudulent, it will be understood that it is a very high likelihood that the video stream is fraudulent. If the flow is not recognized, it may still be categorized as a video streaming flow, but may require further review to determine the attributes such as, provider, channel name, licensed or unlicensed content, or the like.

In a specific example, a new Provider may use the same sources as a previously known provider. This simple correlation may be detected by the system and the new provider may be automatically labelled a fraudulent video provider. In other cases, correlations may be done by matching channel information provided across providers. This data often appears in the packet payloads of select flows. The system is configured to watch for indications that these flows are occurring often by watching URL query parameters of requests from a video client. As the system is configured to work in real-time or near real-time, video streams are intended to be monitored from the beginning of the video stream traffic flow and may be classified as legitimate or fraudulent quickly and efficiently without human intervention.

When a video stream is detected by the system, the system may select payload bytes and send the data to a processing engine associated with the analysis module 110 to decode the payload to extract channel information. The extracted channel information provides a provider channel map that is intended to be unique to the provider. The channel map may be used to correlate with previously known providers as extracted information can either match fully or partially with previously known providers.

Once the system has discovered channel data, the system may construct a traffic matching map that is deployed back into the real time system for monitoring video stream of the new provider, and any channel/movie/video title information correlated from processing and cross-referencing the channel data. The system is intended to be continuously updated with new data and flow criteria based on the legitimate and illegitimate video stream traffic flows the system in monitoring.

The data is also normalized to; for example, eliminate spelling issues and general minor channel/movie/video title mismatches. The system may store a regularly updated channel list to determine channel names. If a video streaming service or video stream is seen with a similar name, title, or the like, the flow may be reviewed and a similar name may be normalized to reflect or to be matched to a legitimate channel or provider name.

In a specific example, HBOO_1 can be normalized to HBO where a channel attribute comparison may indicate the probability of this match to be probabilistically high. In some examples, a match may be considered a match if the match is 80%, or other threshold. It will be understood that this percentage may be configurable and may be amended from time to time.

Another correlation the system may perform may be to analyze linear sections of unknown video streams and correlate them with known videos. For example, when the system detects HBO, the system may profile the video stream traffic flow to provide further attributes, for example, metrics about but not limited to bitrate, chunking request intervals, resolution, device type, and network access type. The system may then use these metrics to attempt to match unknown video flows to see if a probabilistic correlation exists. If the probability is above a predetermined threshold, for example, 80%, the video may be flagged as a fraudulent video. In some cases, the video stream may be noted and a report may be provided to the operator or service provider. In other cases, the system may be configured to provide traffic actions to reduce the quality or otherwise shape the stream to make it unwatchable by an end-user or the subscriber. In still other cases, the system may terminate or otherwise block the traffic flow.

Embodiments of the system and method are intended to determine a traffic profile or fingerprint on a known device on a network access type (for example, fixed line, wireless, or the like.). From this traffic profile, unknown traffic that is accessing the same channel and same device on a network should align very closely, especially as live TV and other video streaming have time critical access requirements which tighten the behavior characteristics of the traffic.

Figure 5:
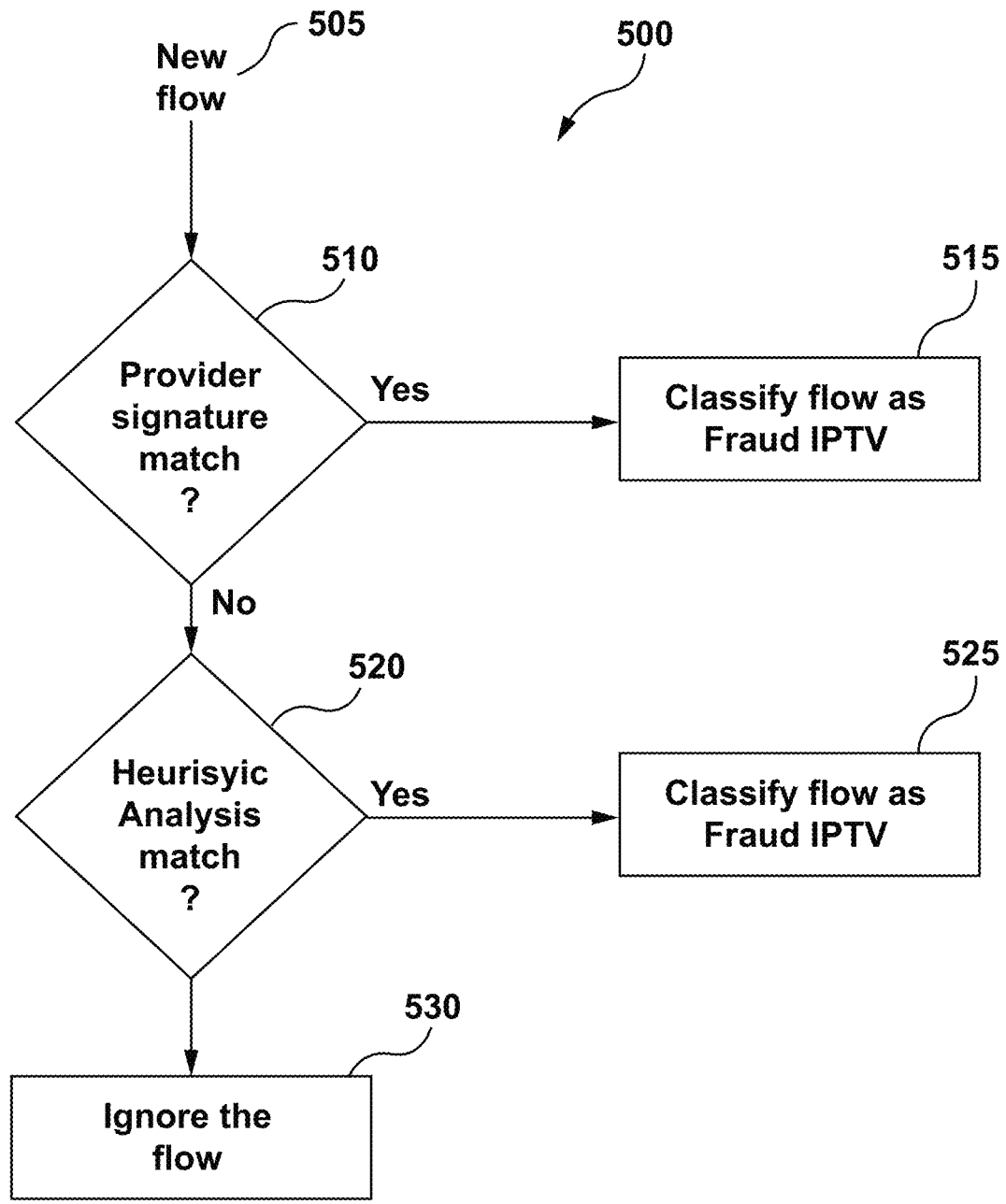
FIG. 5 is a flow chart of an embodiment of a method for classifying a video stream according to an embodiment.

FIG. 5 is a flow chart for a method 500 for classifying video streaming traffic flows. At 505, the system receives a new traffic flow to review and analyze. At 510, the analysis module 105 reviews the data using previously IPTV fraud providers' signatures as stored attributes retrieved from a memory component. The analysis module 105 may review the signatures, using, for example attributes such as: HTTP Header fields (Host, User-agent etc.) based signatures, SSL (SNI etc.) based signatures, Client details (IP Address, Port etc.) or the like. At 510, the analysis module 105 determines if there is an attribute match based on the signatures. At 515, if there is an attribute match, the video module 110 may classify the video stream traffic flow as fraudulent.

At 520, if there is no match, the analysis module 105 may perform further analysis including heuristic analysis detection of the video streaming traffic flow. In some cases, the analysis will include review popular IPTV streaming platforms related signatures and associated traffic behavior (authentication, fetching video streams etc.) based signatures. The memory component may further maintain a history of fraudulent and legitimate video providers and associated flow attributes (for example, server IP used, time of video, video frame hashes and the like). The analysis module 105 is intended to use the retrieve and review the stored data. From the analysis, the video module 110 may then determine if a fraudulent flow is seen from one of such servers, and classify the flow as fraudulent, at 525. If the probability of the video flow is below a predetermined threshold, the video module 110 will not classify the video stream as fraudulent and the video stream will be ignored, at 530.

Figure 6:
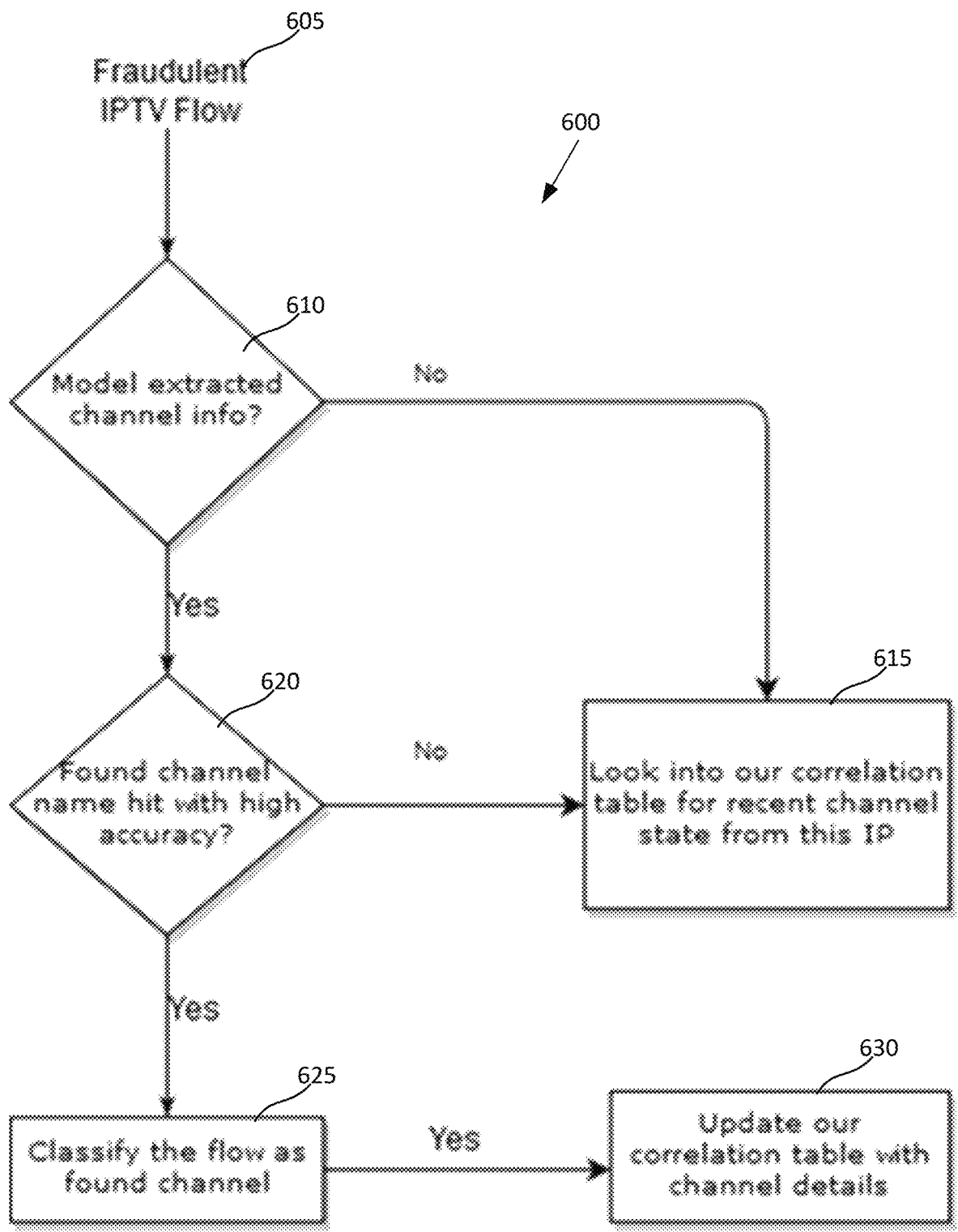
FIG. 6 is a flow chart of an embodiment of a method for updating a decision matrix.

FIG. 6 illustrates a flow chart of a method 600 for automatic extraction of video details. At 605, the system receives a traffic flow. At 610, the analysis module 105 is configured to parse the HTTP header fields and expose video details. In some cases, the analysis module 105 may use a pattern recognition, classification or statistical method to identify the channel information from the HTTP fields. In some cases, the analysis module 105 may use NLP or ML trained models. The analysis module 105 is intended to identify the part of the HTTP URI that has channel information. The analysis module 105 may return one or more sub-strings from URI that contain channel information or nothing.

At 615, if a sub-string is returned, the video module 110 may be configured to map the channel information to actual channel name using NLP based string matching methods or other similar methods. In a specific example, "US_FOXSPORTS_HD1" is the part of the URI identified by the analysis module 105. The analysis module may convert this string to a channel name "Fox Sports HD 1". A predetermined accuracy threshold to convert the string may be, for example, 80% to be considered a match. If, for example, the analysis module 105 returns two sub-strings, the channel name with highest accuracy hit with a channel name may be considered, at 620. If the match is above the predetermined threshold, at 625, the system will classify the flow with the matched channel. At 630, the system will update the correlation within the memory component and include the associated attributes to the flow that have been extracted or derived by the analysis module 105.

For example, if a channel is recognized for a flow, the system may store the channel name found, the client and server details (for example, the IP Addresses, Port and the like.) in a video correlation table.

If channel name is not able to be extracted from the video stream flow, a similar method is intended to be completed on other associated attributes in order to determine is any video details found previously may be correlated to the current flow to determine the probability that the current video stream traffic flow is legitimate or fraudulent.

In a specific example, a channel or otherwise legitimate video provider wishes to provide paid subscribers with a video stream of an upcoming football match. At the commencement of the football match, the system may observe a large spike in video streaming traffic, wherein subscribers are streaming video from various sources. If the system has access to traffic flow attributes from the legitimate football video stream, the unclassified video streams may be reviewed and determined whether they are illegitimate football video streams or if they are unrelated video streams. In some cases, the system may determine attributes, for example, a packet time stamp associated with the video stream traffic flow. Having a packet time stamp that matches the time stamp of the legitimate football match video stream may be used to indicate that the video stream may be fraudulent.

If the system may review the video stream traffic flow attributes with respect to bitrate, channel name, derived attributes from the packet payload. The system may also compare hashes of the video frames with respect to the legitimate video stream to see whether the frames appear to match. With the various correlations and analysis done by the analysis module, using various probabilistic models and/or other supervised or unsupervised machine learning models and/or data mining techniques, matches with respect to the channel names and other traffic flow attributes, the system is configured to determine whether the video stream is a fraudulent stream of the football match or an unrelated video stream. If a fraudulent video stream of the football match is found, the system may block access to the stream, may provide notice to the service provider and/or the customer watching the video stream, or may otherwise flag the video provider and the customer to the Internet Service Provider.

In the preceding description, for purposes of explanation, numerous details are set forth in order to provide a thorough understanding of the embodiments. However, it will be apparent to one skilled in the art that these specific details may not be required. In other instances, well-known structures may be shown in block diagram form in order not to obscure the understanding. For example, specific details are not provided as to whether the embodiments or elements thereof described herein are implemented as a software routine, hardware circuit, firmware, or a combination thereof.

Embodiments of the disclosure or elements thereof can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method for monitoring and managing video stream content comprising:
   receiving a traffic flow;
   determining if the traffic flow is a video streaming traffic flow;
   if the traffic flow is a video streaming traffic flow;
      determine at least two attributes associated with the video streaming traffic flow, wherein the at least two attributes are detected from traffic flow level information;
      determine a probability that the traffic flow is fraudulent based on a heuristic analysis of the at least two associated attributes based on a decision matrix;
      if the probability is above a predetermined threshold, flag the traffic flow as a fraudulent video streaming traffic flow, otherwise allow the traffic flow to proceed to its destination without being flagged;
   if the traffic flow is not a video streaming traffic flow, allow the traffic flow to proceed to its destination.

2. The method according to claim 1 wherein determining the at least two attributes associated with the traffic flow comprises:
  retrieving at least one packet from the traffic flow;
  determining at least one header of the at least one packet; and
  determining the at least two attributes by determining at least two fields from within the at least one header.

3. The method according to claim 2 wherein the at least one header is selected from the group of Internet Protocol Header; Transmission Control Protocol Header; HyperText Transfer Protocol; Transport Layer Security/Secure Sockets Layer Header; and Domain Name Server Header.

4. The method according to claim 1 wherein determining at least two attributes associated with the traffic flow comprises:
  determining a video frame of the video streaming traffic flow;
  performing a hash of the video frame of the video streaming traffic flow;
  retrieving a second hash of a video frame of a legitimate video stream; and
  comparing the hash to the second hash to determine whether the hashes match.

5. The method according to claim 1 wherein determining a probability of that the traffic flow is fraudulent comprises:
  retrieving at least one legitimate video stream attribute from a memory component;
  performing a comparison between the at least one legitimate video stream attributes and one of the two attributes; and
  determining a match probability of the legitimated video stream and the traffic flow based on the comparison.

6. The method according to claim 5, wherein the at least two attributes are considered matched if the match probability is above 80%.

7. The method according to claim 1, wherein determining a probability of that the traffic flow is fraudulent comprises:
  retrieving legitimate video stream attributes from a memory component; and
  performing a probabilistic matching algorithm with respect to the associated attributes of the video stream traffic flow with the retrieved legitimate video stream attributes.

8. The method according to claim 1 further comprising performing traffic actions on the video stream traffic flow if the probability that the traffic flow is fraudulent is above a second predetermined threshold.

9. The method according to claim 1 wherein determining the at least two attributes associated with the traffic flow comprises:
  determining a packet timestamp associated with the video streaming traffic flow; and
  updating the probability that the traffic flow is fraudulent based on the timestamp.

10. The method according to claim 1, wherein determining the at least two attributes associated with the traffic flow comprises:
  retrieving at least one packet from the traffic flow;
  determining a packet payload from the at least one packet;
  determining a channel name from the payload of the at least one packet; and
  updating the probability that the traffic flow is fraudulent based on the channel name.

11. A system for monitoring and managing video stream video stream content comprising:
  an analysis module configured to:
    receive a traffic flow;
    determine if the traffic flow is a video streaming traffic flow;
    if the traffic flow is a video streaming traffic flow;
      determine at least two attributes associated with the video streaming traffic flow, wherein the at least two attributes are detected from traffic flow level information;
  a video module configured to determine a probability that the traffic flow is fraudulent based on a heuristic analysis of the at least two associated attributes based on a decision matrix; and
  a reporting module configured to flag the traffic flow as a fraudulent video streaming traffic flow if the probability is above a predetermined threshold.

12. The system according to claim 11, wherein the analysis module is further configured to:
  retrieve at least one packet from the traffic flow;
  determine at least one header of the at least one packet; and
  determine at least two attributes by determining at least two fields from within the at least one header.

13. The system according to claim 12 wherein the at least one header is selected from the group of Internet Protocol Header; Transmission Control Protocol Header; HyperText Transfer Protocol; Transport Layer Security/Secure Sockets Layer Header; and Domain Name Server Header.

14. The system according to claim 11 wherein the analysis module is further configured to:
  determine a video frame of the video streaming traffic flow;
  perform a hash of the video frame of the video streaming traffic flow;
  retrieve a second hash of a video frame of a legitimate video stream; and
  compare the hash to the second hash to determine whether the hashes match.

15. The system according to claim 11 wherein the analysis module is further configured to:
  retrieve at least one legitimate video stream attribute from a memory component;
  perform a comparison between the at least one legitimate video stream attributes and one of the at least two traffic flow attributes; and
  the video module is configured to determine a match probability of the legitimated video stream and the traffic flow based on the comparison.

16. The system according to claim 15, wherein the at least two attributes are considered matched if the match probability is above 80%.

17. The system according to claim 11, wherein the analysis module is further configured to:
  retrieve legitimate video stream attributes from a memory component; and
  perform a probabilistic matching algorithm with respect to the associated attributes of the video stream traffic flow with the retrieved legitimate video stream attributes.

18. The system according to claim 11 wherein the reporting module is further configured to perform traffic actions on the video stream traffic flow if the probability that the traffic flow is fraudulent is above a second predetermined threshold.

19. The system according to claim 11 wherein the analysis module is further configured to retrieve at least one packet from the video streaming traffic flow and determine a packet timestamp associated with the at least one packet; and the video module is configured to update the probability that the traffic flow is fraudulent based on the timestamp.

20. The system according to claim 11, wherein the analysis module is further configured to:
   retrieve at least one packet from the traffic flow;
   determine a packet payload from the at least one packet; and
   determine a channel name from the payload of the at least one packet; and
   the video module is configured to update the probability that the traffic flow is fraudulent based on the channel name.

\* \* \* \* \*